July 22, 1969  R. D. LACOE, JR  3,456,825
SLIDE EDITOR AND STORAGE APPARATUS
Filed Feb. 21, 1968  2 Sheets-Sheet 1

INVENTOR.
RALPH D. LACOE, JR.
BY Knox & Knox

July 22, 1969  R. D. LACOE, JR  3,456,825
SLIDE EDITOR AND STORAGE APPARATUS
Filed Feb. 21, 1968  2 Sheets-Sheet 2
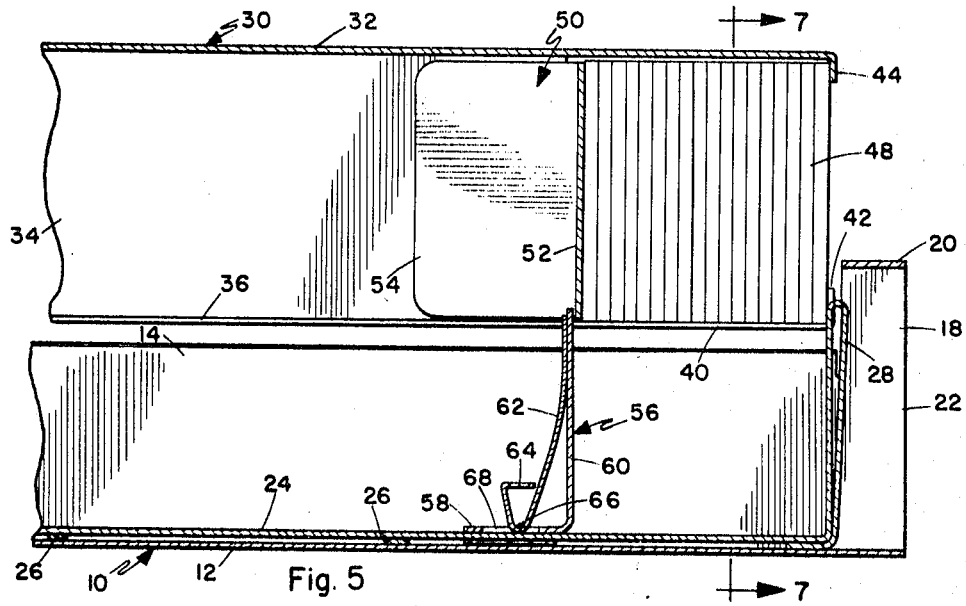
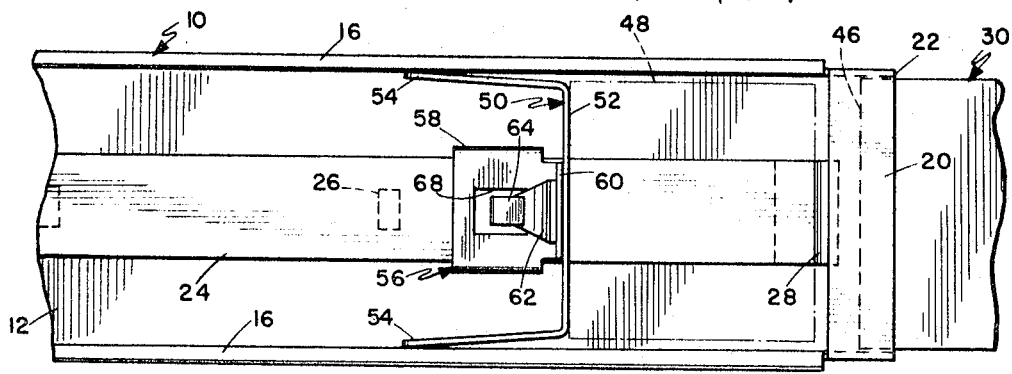
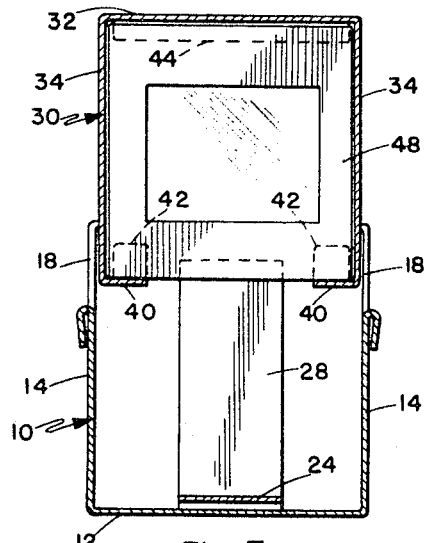
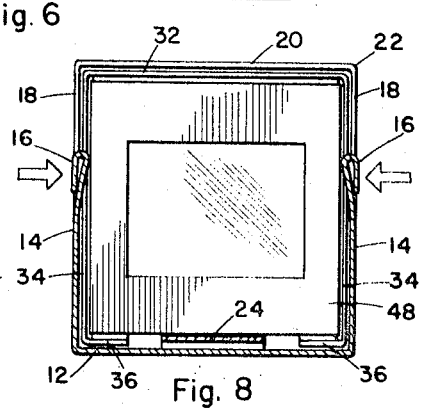
INVENTOR.
RALPH D. LACOE, JR.
BY Knox & Knox

United States Patent Office 3,456,825
Patented July 22, 1969

3,456,825
SLIDE EDITOR AND STORAGE APPARATUS
Ralph D. Lacoe, Jr., 2436 Presidio Drive,
San Diego, Calif. 92103
Filed Feb. 21, 1968, Ser. No. 707,159
Int. Cl. B65b 69/00
U.S. Cl. 214—301         7 Claims

ABSTRACT OF THE DISCLOSURE

A combination of a slide storage tray and a slide editing tray, with which a stack of slides can be deposited in or removed from the editing tray by a sliding pass of the storage tray through the editing tray. The transfer is made without disturbing the slides and the editing tray is provided with means for aligning the slides neatly after sorting, so that the stacked slides are removed smoothly without binding. The storage tray can also be used as a magazine with some types of slide projectors.

Background of the invention

The present invention relates to photographic slide handling means and specifically to slide editor and storage apparatus.

Photograph transparencies mounted as slides are often stored in elongated trays which are used as magazines to feed slides into a projector and collect the slides after projection. When sorting or editing slides they are usually removed from the tray and either stacked or placed in separate containers. With some types of magazines which are flanged to retain the slides, individual slides cannot be removed and the complete stack must be removed from the magazine for editing. Since many trays or magazines may hold fifty, a hundred, or even more slides, removal and replacement can become a problem.

Summary of the invention

The apparatus described herein includes a slide storage tray, which can be used as a magazine for some projectors, and an editing tray in which the slides can be sorted and arranged. The trays are structurally arranged so that the storage tray interfits with the editing tray, the slides being deposited in or removed from the editing tray in an undisturbed stack by a simple sliding action of the storage tray in the editing tray. After the slides have been arranged as required in the editing tray, a squeeze action of the tray sides aligns the slides neatly for sliding pickup by the storage tray without binding. Both trays have adjustable retaining means for holding any number of slides in a neat stack.

Brief description of the drawings

FIGURE 5 is a sectional view similar to FIGURE 3, but showing transfer of slides from one tray to the other;
FIGURE 6 is a top plan view of the trays as shown in FIGURE 3;
FIGURE 7 is a sectional view taken on line 7—7 of FIGURE 5;
and
FIGURE 8 is a sectional view taken on line 8—8 of FIGURE 3.

Similar characters of reference indicate similar or identical elements and portions throughout the specification and throughout the views of the drawings.

Description of the preferred embodiment

Figure 1:
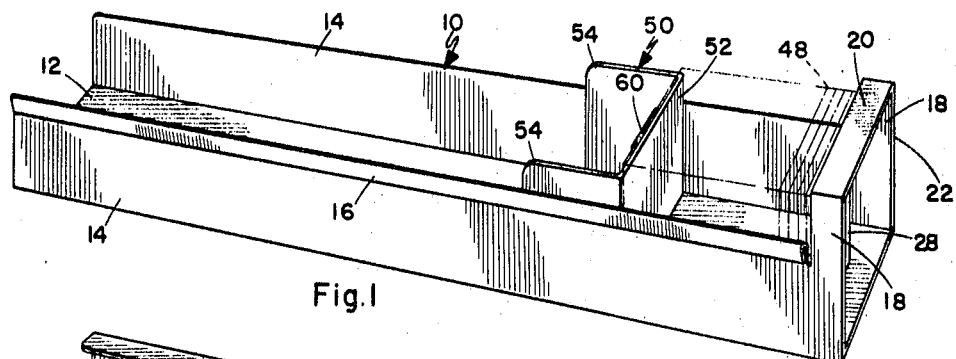
FIGURE 1 is a perspective view of the editing tray.

The editing tray 10 is an elongated box-like unit open at both ends and having a bottom panel 12 and vertical parallel sides 14, the sides preferably being slightly more than half the height of a standard slide for convenient handling of slides. Editing tray 10 is best made from thin sheet metal and the upper longitudinal edges of sides 14 have outwardly and downwardly return folded flanges 16 for reinforcement and to provide smooth edges. However, plastic or other materials could be used if desired. At one end, defined for convenience as the forward end, the sides 14 have narrow upwardly extended portions 18 joined at their upper ends by a cross piece 20 to form a short box portion 22 for guide purposes, as hereinafter described. Extending along the center of bottom panel 12 is a flat rail 24, spaced slightly above the bottom panel on supports 26. At the forward end of rail 24 is a vertical retaining post 28 which is return folded for added stiffness and is disposed at the rear of box portion 22. For simplicity of structure post 28 may be integral with the rail 24, as shown.

The storage tray 30 is an elongated box-like unit with a bottom panel 32 and sides 34, which are the full height of a slide and have inwardly turned, opposed retaining flanges 36 along their upper edges. Slides are thus almost fully enclosed and fit closely in the storage tray. At one end, referred to as the forward end, the sides 34 have cut out portions 38, leaving portions of flanges 36 extending as arms 40, the ends of which have downwardly turned tabs 42. The specific configuration of cut out portions 38 as shown is adapted to use of the storage tray as a magazine in a projector and is not critical to the present disclosure. Across the end of bottom panel 32, coplanar with and opposed to tabs 42, is an upwardly turned stop flange 44. The other end of storage tray 30 is fully open with no obstructions, the end being substantially square cut with a continuous smooth entry edge 46.

Figure 2:
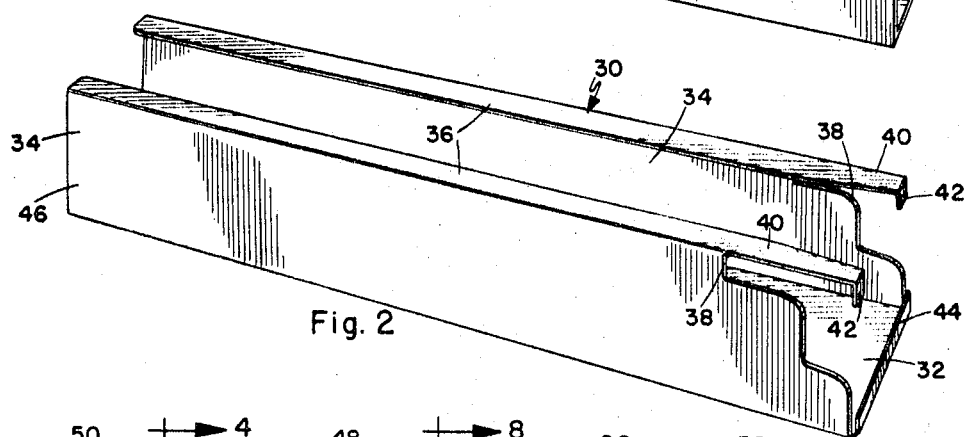
FIGURE 2 is a perspective view of the storage tray.

Storage tray 30 is dimensioned to slide smoothly within editing tray 10 and to pass through box portion 22 with a reasonably close fit, which ensures proper alignment. The storage tray is inverted from the position shown in FIGURE 2, so that the flanges 36 pass on both sides of and slightly below the raised rail 24. Slides 48 stacked in the storage tray 30 are retained by tabs 42 and stop flange 44 and are held in a neat stack by a keeper 50. The keeper is made from flat sheet material and has a flat plate portion 52 slightly smaller than a slide, with rearwardly extending wings 54 which are resilient and diverge to frictionally engage the sides 34. Keeper 50 is thus slidably adjustable to hold any number of slides in place.

In the editing tray 10 is an adjustable stop 56, comprising a saddle 58 which grips and is slidable along rail 24, and a post 60 extending vertically from the forward end of the saddle. On the rear side of post 60 is a resilient spring clamp 62, fixed to the post at its upper end and extending downwardly and rearwardly from the post. At the lower end the clamp 62 has a folded grip portion 64 with a friction tip 66, which projects through an opening 68 in saddle 58 to engage the top surface of rail 24. Stop 56 can thus be pushed forwardly to contain a stack of slides against retaining post 28, the clamp 62 dragging along rail 24. However, rearward motion is resisted by jamming action of the clamp, unless the clamp is released by grasping and raising grip portion 64.

The open topped editing tray with low sides makes sorting and arranging the slides a simple matter. When the slides are in order the stop 56 is moved forward to hold the slides in a stack, although not too tightly. Then the sides 14 are pressed inwardly in the vicinity of the slides, as indicated by the directional arrows in FIGURE 8. The resiliency of the tray sides permits the necessary inward displacement but, since the upper edges of the sides are reinforced by flanges 16, the edges remain rigid and straight and the slides are pushed into a neatly aligned stack between and clear of the sides. As illustrated, the keeper 50 is also placed in the editing tray, with plate portion 52 between the slides and stop 56 and the wings 54 extending rearwardly. The keeper will be centered by the inward pressure of the sides when the slides are aligned.

Figure 3:
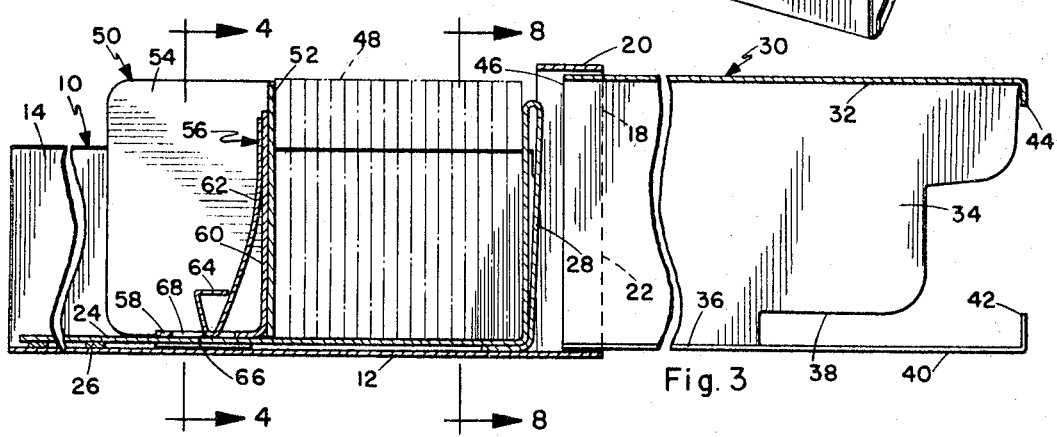
FIGURE 3 is an enlarged longitudinal sectional view showing the interfitting of the trays.
Figure 4:
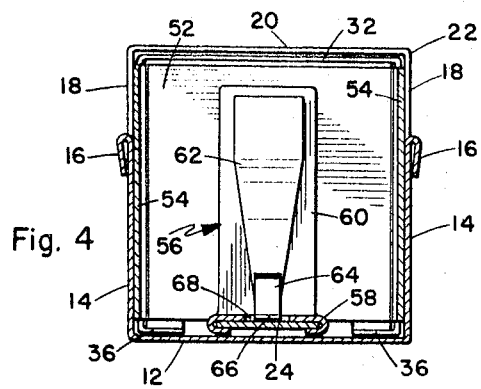
FIGURE 4 is a sectional view taken on line 4—4 of FIGURE 3.

To remove the slides from the editing tray, the entry edge 46 of storage tray 30 is inserted in box portion 22, as in FIGURES 3 and 6. The storage tray is then slid into the editing tray from right to left, until the tabs 42 and stop flange 44 engage the forward end of the stack of slides. Since the slides are supported on raised track 24 and spaced from sides 14 by the alignment action, there is clearance all around for the storage tray to slide smoothly and enclose the slides. In the last position the storage tray has passed completely through box portion 22 and can be lifted upwardly out of the editing tray, as in FIGURE 5, taking with it the undisturbed stack of slides retained by keeper 50. It should be noted that the keeper could be inserted into storage tray 30 after the slides have been picked up, but its pre-insertion in the editing tray ensures that the slides will be held in place during and after transfer.

Transferring the slides from the storage tray to the editing tray is simply a matter of reversing the operation. The storage tray is inserted downwardly into the editing tray, with the stack of slides between post 28 and stop 56, the latter being loosened slightly to facilitate this. This action is also depicted by FIGURE 5. Storage tray 30 is then slid through box portion 22 and removed from the editing tray, leaving the slides in place in the editing tray. It should be noted that it is not essential to have the stop 56 in place in the editing tray when slides are being transferred from the storage tray, since the keeper 50 will hold the slides in a stack. However, when removing slides from the editing tray to the storage tray, the stop 56 is necessary to hold the slides against the longitudinal sliding motion of the storage tray.

Transfer of slides from either tray to the other is thus a simple matter of insertion and sliding of the storage tray in the editing tray. Jamming is avoided by the slide alignment provided for and the slides are not prone to damage during the transfer.

It is understood that minor variation from the form of the invention disclosed herein may be made without departure from the spirit and scope of the invention, and that the specification and drawings are to be considered as merely illustrative rather than limiting.

I claim:
1. Slide editor and storage apparatus, comprising:
  an editing tray and a slide storage tray;
  said editing tray being an elongated box-like unit having a bottom panel and upwardly extending longitudinal sides, the ends and top thereof being substantially open;
  retaining means in said editing tray for holding a stack of slides in spaced relation to said sides and bottom panel;
  said storage tray being an elongated box-like unit with substantially open ends and having an open longitudinal side bounded by inwardly turned, confronting longitudinal flanges;
  one end of said storage tray having stop means partially obstructing that open end;
  the internal cross section of said storage tray being a close fit for slides disposed perpendicular to the longitudinal axis thereof;
  and said storage tray being longitudinally slidable in said editing tray and being insertable into and removable from the open side of the editing tray, for transferal of slides between the trays.

2. The structure of claim 1, wherein said retaining means includes a longitudinal slide supporting rail on said bottom panel, a fixed vertical stop at one end of said rail, and a frictionally held adjustable stop slidably mounted on said rail;
  said storage tray being slidable in said editing tray with the flanges of the storage tray on opposite sides of said rail, to pass below slides supported on the rail.

3. The structure of claim 1, wherein at least portions of the sides of said editing tray are resilient and the upper edges of the sides are longitudinally stiffened, whereby opposed inward pressure on said sides causes longitudinal alignment of a stack of slides therebetween.

4. The structure of claim 1, wherein one end of said editing tray has a box portion through which said storage tray is a close sliding fit.

5. The structure of claim 1, wherein said retaining means includes a longitudinal slide supporting rail fixed to and spaced above said bottom panel, a fixed vertical stop at one end of said rail, and a frictionally held adjustable stop slidably mounted on said rail;
  at least portions of said editing tray sides being resilient and the upper edges of the sides being longitudinally stiffened, whereby opposed inward pressure on the sides causes longitudinal alignment of a stack of slides therebetween.

6. The structure of claim 5, wherein the end of said editing tray adjacent said fixed stop has upwardly extending side portions and a cross piece joining the upper ends of said side portions, forming a box portion through which said storage tray is a close sliding fit.

7. The structure of claim 6, wherein said fixed stop is substantially coplanar with the inner end of said box portion, whereby the storage tray must be passed completely through the box portion before being lifted from the editing tray.

References Cited

UNITED STATES PATENTS 2,630,219 3/1953 Pierce _____ 206—74
3,400,843 9/1968 Johnson _____ 214—309

HUGO O. SCHULZ, Primary Examiner

U.S. Cl. X.R.
206—74